United States Patent [19]

Shimizu

[11] 4,319,278
[45] Mar. 9, 1982

[54] VIDEO SWITCH CIRCUIT

[75] Inventor: Tetsuo Shimizu, Tokyo, Japan

[73] Assignee: Universal Pioneer Corporation, Tokyo, Japan

[21] Appl. No.: 160,346

[22] Filed: Jun. 17, 1980

[30] Foreign Application Priority Data

Jun. 29, 1979 [JP] Japan .................................. 54-81402

[51] Int. Cl.³ .......................... H04N 5/22; H04N 5/04
[52] U.S. Cl. .................................... 358/181; 358/188; 358/148; 358/149
[58] Field of Search ................. 358/181, 93, 188, 160, 358/148, 149

[56] References Cited

U.S. PATENT DOCUMENTS 2,686,833  8/1954  Baracket et al. .................... 358/148

*Primary Examiner*—Richard Murray
*Attorney, Agent, or Firm*—Sughrue, Mion, Zinn, Macpeak & Seas

[57] ABSTRACT

A video switch circuit for turning off and on picture portions of a composite video signal while leaving a synchronizing signal contained within the composite video signal so that a video device using the output video signal does not have to resynchronize when it is desired to switch on the overall composite video signal. A synthetic synchronizing signal is produced by operating an electronic switch between two fixed voltage levels corresponding to the pedestal level and synchronization peak level of the composite video signal in response to synchronization pulses separated therefrom. A second switch selects between the synthetic synchronizing signal and fixed voltage levels. A third output switch selects between the output of a clamp circuit which clamps one of the pedestal levels of a composite video signal and the synchronization peak level of the synchronizing signal contained within the composite video signal to a predetermined clamp potential and the output of the second switch. The second and third switches operate in response to externally supplied binary control signals.

3 Claims, 8 Drawing Figures

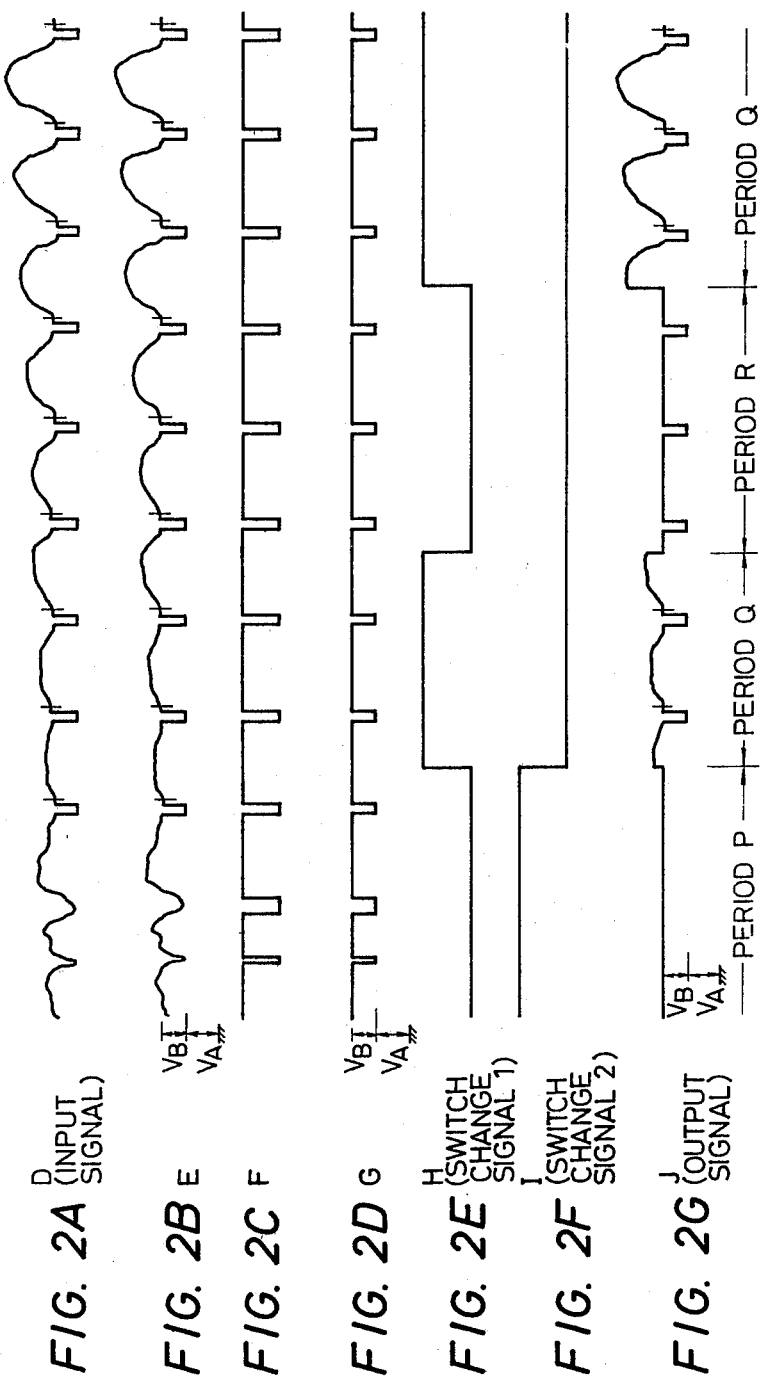

VIDEO SWITCH CIRCUIT

BACKGROUND OF THE INVENTION

The present invention relates to a video switch circuit. The term "video switch circuit" as herein used is intended to mean a circuit which operates to turn on and off a composite video signal or to switch between plural composite video signals.

It is frequently required to turn on and off a composite video signal in a circuit for supplying a composite video signal to a video signal receiving device. If, in this connection, the composite video signal is merely turned off, or the application of the composite video signal is completely suspended with no signal at all outputted, synchronization is lost in the video signal receiving device since the synchronizing signals are carried by the composite video signal. When the video switch circuit is later turned back on to again supply a composite video signal, the synchronization remains unstable for some period of time. Accordingly, it is necessary to supply a synchronizing signal to the video device even if the video switch circuit has been turned off. In other words, when the video switch circuit is turned off, it is necessary to still provide the synchronizing signal at the output of the video switch circuit.

In order to meet this requirement, the synchronizing signal in this case must be compatible in signal voltage level with the synchronizing signal of the composite video signal supplied to the video signal receiving device. Video switch circuits of the prior art satisfying such a requirement unavoidably were intricate in construction.

In view of the foregoing, an object of the invention is to provide a video switch circuit having a simple construction in which the above-described difficulties have been eliminated.

SUMMARY OF THE INVENTION

This, as well as other objects of the invention, are met by a video switch circuit including a clamping circuit for clamping either the pedestal level of a composite video signal or the synchronization peak level of a synchronizing signal contained within the composite video signal to a predetermined clamp potential, means for providing a synthetic synchronizing signal having synchronizing pulses coincident with those of the synchronizing signal contained within the composite video signal, but having levels which are fixed and independent of the levels of the synchronizing signal contained within the composite video signal, and switching means for switching between the output of the clamping circuit and the output of the synthetic signal providing means.

Yet further, this and other objects of the invention are satisfied by a video switch circuit including a clamping circuit for clamping either the pedestal level of a composite video signal or the synchronization peak level of a synchronizing signal contained within the composite video signal to a predetermined clamp potential, and first, second and third video switches. The first video switch has first and second contacts coupled to a voltage source with the potential difference between the first and second contacts being equal to the potential difference between the pedestal level and the synchronization peak level. Oone of the first and second contacts is coupled to a voltage source having a potential the same as the clamp potential. A first armature contact of the first video switch is switchable between the first and second contacts in synchronization with the synchronizing signal contained within the composite video signal. The second video switch has third and fourth contacts with the third contact coupled to the first contact and the fourth contact coupled to the armature contact of the first video switch. A second armature contact is switchable between the third and fourth contacts in response to a first external binary signal. The third video switch has a fifth contact coupled to the output of the clamping circuit and a sixth contact coupled to the second armature contact of the second video switch. The third video switch has a third armature contact which is switchable between the fifth and sixth contacts thereof in response to a second external binary signal.

BRIEF DESCRIPTION OF THE DRAWINGS

FIG. 2 is a waveform diagram used for a description of the operation of the video switch circuit shown in FIG. 1.

DESCRIPTION OF THE PREFERRED EMBODIMENTS

Figure 1:
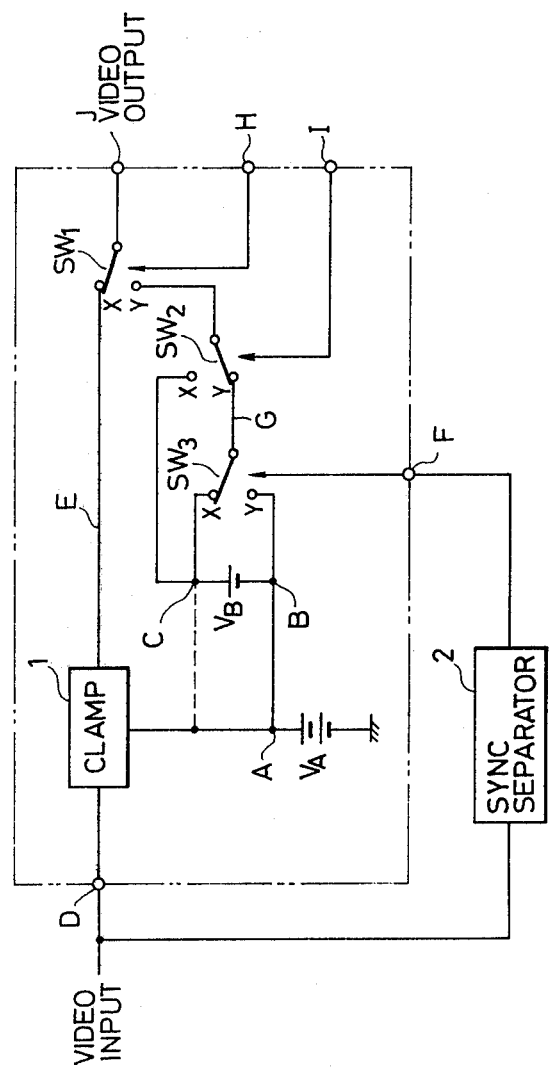
FIG. 1 is a circuit diagram, partly as a block diagram, showing a preferred embodiment of a video switch circuit constructed according to the present invention.

A preferred embodiment of the invention will be described with reference to the drawings.

FIG. 1 is a block diagram showing an example of a video switch circuit constructed according to the invention. The video switch circuit, as shown in FIG. 1, includes a voltage source VA for determining a clamp potential; a clamping circuit 1 for clamping to the clamp potential VA the pedestal level of a video signal or the level of a synchronizing signal, hereinafter referred to as "a synchronization peak level" when applicable, applied to an input terminal D; a voltage source VB for supplying a voltage which is equal to the potential difference between the pedestal level or magnitude of the synchronizing signal portion of a composite video signal applied to the input terminal D and the synchronization peak level; and video switch elements SW1, SW2 and SW3.

The armatures of the video switch elements SW1, SW2 and SW3 are switched to the contacts X when binary signals applied to input terminals H, I and F are at high voltage levels and are switched to the contacts Y when the binary signals are at low voltage levels.

In FIG. 1, reference numeral 2 designates a synchronizing signal separating circuit the output of which is applied to an input terminal F.

The operation of the video switch circuit shown in FIG. 1 will be described with reference to FIGS. 2A–2G which are a series of waveforms taken at various points within the circuit of FIG. 1.

When a positive polarity composite video signal having a variable pedestal level and synchronization peak level as shown in the FIG. 2A is applied to the input terminal D, the synchronization peak level of the composite video signal is clamped to the clamp potential VA by the clamping circuit 1 as a result of which a signal E as shown in FIG. 2B is produced. The pedestal level is at a potential VA+VB.

The composite video signal shown in FIG. 2A is further applied to the synchronizing signal separating circuit 2 of which the output waveform is shown in FIG. 2C. The separated synchronizing signal is applied to the input terminal F to operate the video switch element SW3. When the synchronizing signal applied to the input terminal F is at a high level, the potential of the pedestal level is provided at the output G of the video switch element SW3 and, when the synchronizing signal is at a low level, the potential of the synchronization peak level is provided as the output G. The resultant waveform on the output G is shown in FIG. 2D. More specifically, the low level of the output G is at the clamp potential VA while the high level thereof is higher in potential than the clamp potential by the magnitude VB of the synchronizing signal.

When it is required to output the pedestal level potential from the video switch circuit, a low level signal is applied to the input terminal H and a high level signal applied to the input terminal I. As a result, the armatures of the video elements SW1 and SW2 are switched over to the contacts Y and X, respectively. Accordingly, irrespective of the potential of the synchronizing signal applied to the input terminal F, the pedestal level potential is applied to the output terminal J of the video switch circuit. The switches remain in their positions for this state until a video signal supplying device becomes stable so that no unstable composite video signal or synchronizing signal is applied to the video signal receiving device. That is, during this period the video switch circuit is placed in an "off" state. During the period which elapses until the video signal supplying device becomes stable, the pedestal level potential is outputted so that no level variation is present at the time instant when a regular composite video signal or synchronizing signal is provided as indicated during the period P of FIG. 2G.

In the case where it is required to apply only the synchronizing signal to the video device without the video signal, low level outputs are applied to the input terminals H and I. As a result, the armatures of the video switch elements SW1 and SW2 are switched over to the contacts Y and therefore the output G of the video switch element SW3 is applied to the output terminal J of the video switch circuit. That is, only the synchronizing signal is applied to the output terminal J. In this case, the output level potential difference is the magnitude VB of the synchronizing signal as shown during the period R in FIG. 2G.

When it is required to output the composite video signal from the video switch circuit, a high level signal is applied to the input terminal H. As a result, the armature of the video switch element SW1 is switched over to the contact X. Accordingly, irrespective of the armature positions of the video switch elements SW2 and SW3, the composite video signal of FIG. 2B in which the synchronization peak level has been clamped to the clamp potential VA is outputted by the video switch circuit as shown during the period Q in FIG. 2G.

In the description above, the level of the signals applied to the terminals H and I are shown in FIGS. 2E and 2F for each period indicated in FIG. 2G.

In the above description, the synchronization peak level is clamped to the clamp potential VA. However, the pedestal level may be clamped by disconnecting the circuit point A from the circuit point B and connecting the circuit point A to the circuit point C as indicated by the dotted line in FIG. 1. The operation of the video switch circuit thus modified is similar to that described above and therefore need not be described in detail.

As is apparent from the above description, the arrangement of the video switch circuit of the invention is quite simple using only the clamping circuit and three video switch elements. Furthermore, the pedestal level and synchronization peak level of the output signal are stable because they are provided in the form of fixed voltages VA and VA+VB utilizing the clamp potential VA and the synchronizing signal magnitude VB. Even if the level of the synchronizing signal from the synchronizing signal separating circuit varies, the level variation does not appear in the output.

The video switch elements, the voltage sources and the clamping circuit forming the video switch circuit can be readily provided in the form of a single integrated circuit. In this case, fluctuations in characteristics and the variations in temperature of the various elements will be reduced.

What is claimed is:

1. A video switch circuit comprising:
    a clamping circuit for clamping one of the pedestal level of a composite video signal and the synchronization peak level of a synchronizing signal contained within said composite video signal to a predetermined clamp potential;
    a first video switch having a first contact and a second contact coupled to a voltage source, the potential difference between said first and second contacts being equal to the potential difference between said pedestal level and said synchronization peak level, one of said first and second contacts being coupled to a voltage source having a potential of said clamp potential, and a first armature contact switched between said first and second contacts in synchronization with said synchronizing signal constituted within said composite video signal;
    a second video switch having a third contact coupled to said first contact and a fourth contact coupled to said first armature contact of said first video switch, and a second armature contact switchable between said third and fourth contacts in response to a first external binary signal; and
    a third video switch having a fifth contact coupled to an output of said clamping circuit and a sixth contact coupled to said second armature contact of said second video switch, and a third armature contact switchable between said fifth and sixth contacts by a second external binary signal.

2. A video switch circuit comprising:
    a clamping circuit for clamping one of the pedestal level of a composite video signal and the synchronization peak level of a synchronizing signal contained within said composite video signal to a predetermined clamp potential;
    synchronizing pulse separating means for separating synchronizing pulses from said composite video signal;
    pulse generating means for generating synthetic synchronizing pulses corresponding to said synchronizing signal contained within an output of said clamping circuit by using the output of said synchronizing pulse separating means; and
    switch means for switching a video output terminal between the outputs of said clamping circuit and of said pulse generating means in response to an external control signal.

3. A video switch circuit as set forth in claim 2, further comprising:

means for providing direct current whose level is in a range between the synchronization peak level and white level of said composite video signal; and means for selecting one of the outputs of said pulse generating means and of said means for providing direct current in response to a second external control signal, said selecting means being disposed between said pulse generating means and said switch means.

* * * * *